Aug. 2, 1966
H. F. RIETH
3,264,452
DATA PROCESSING APPARATUS
Filed May 21, 1962
4 Sheets-Sheet 1
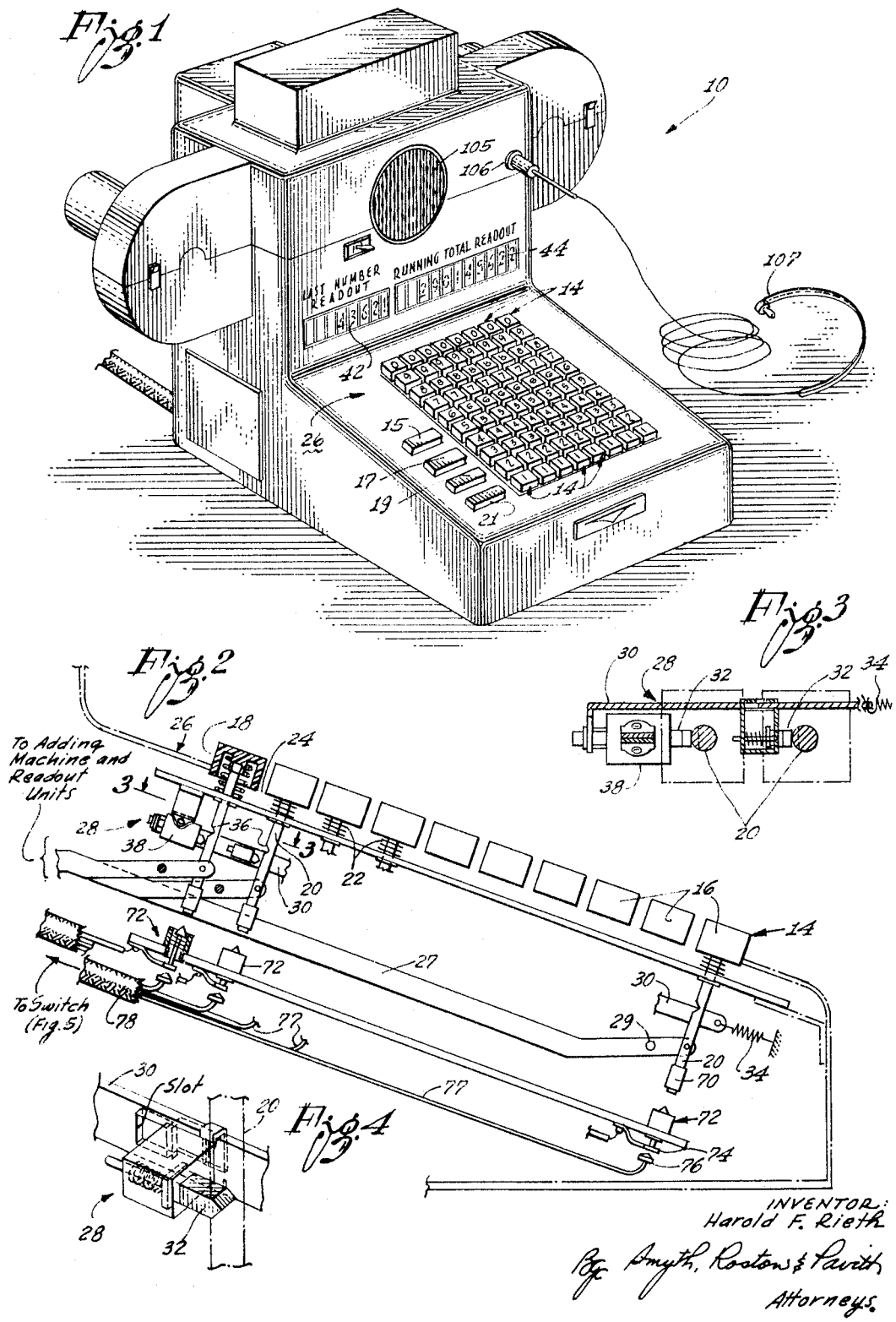
INVENTOR.
Harold F. Rieth
By Smyth, Roston & Pavitt
Attorneys.

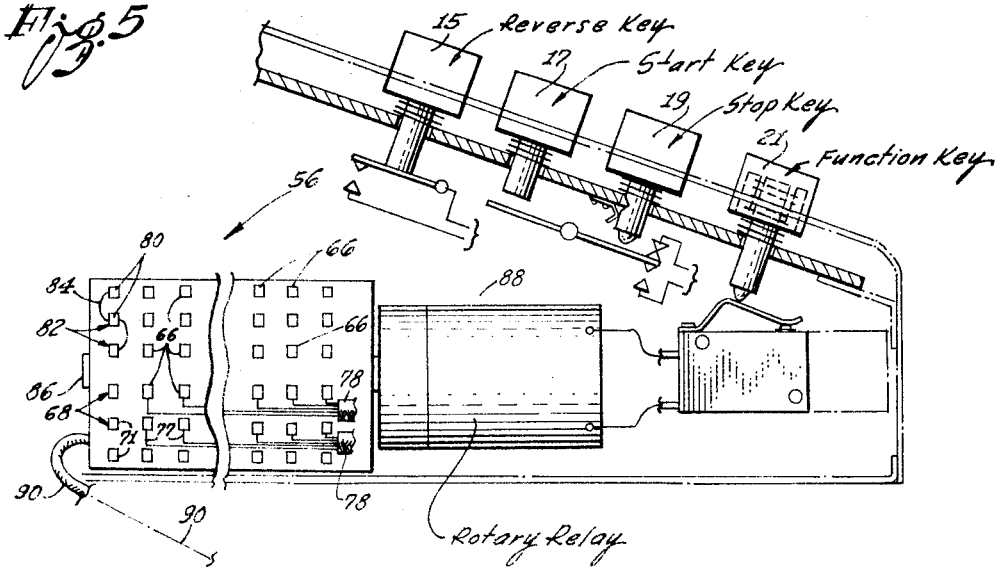
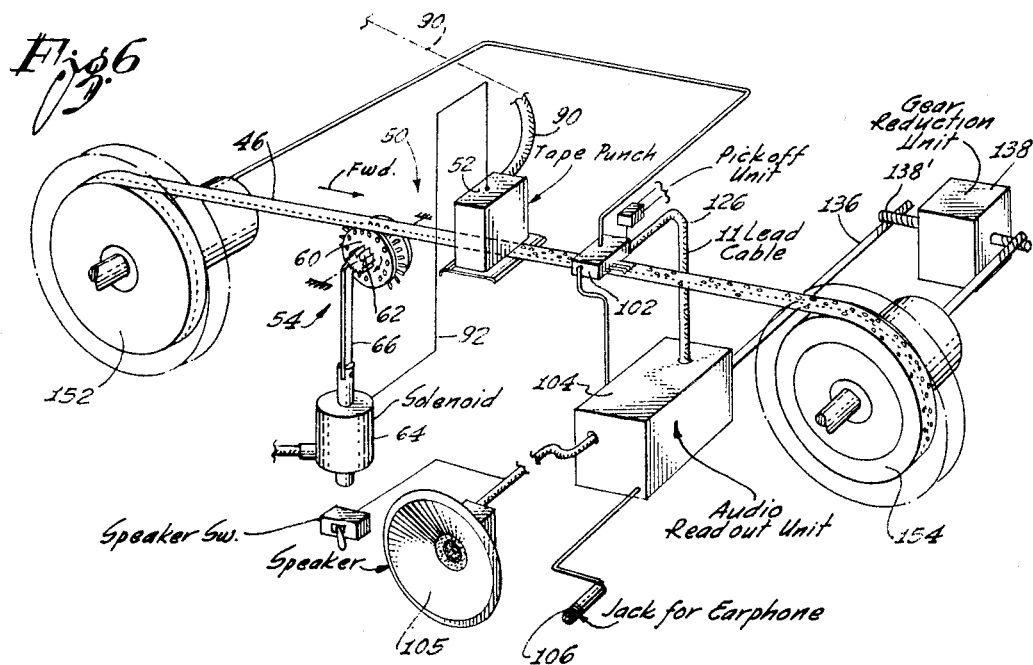

Aug. 2, 1966  H. F. RIETH  3,264,452
DATA PROCESSING APPARATUS
Filed May 21, 1962  4 Sheets-Sheet 3
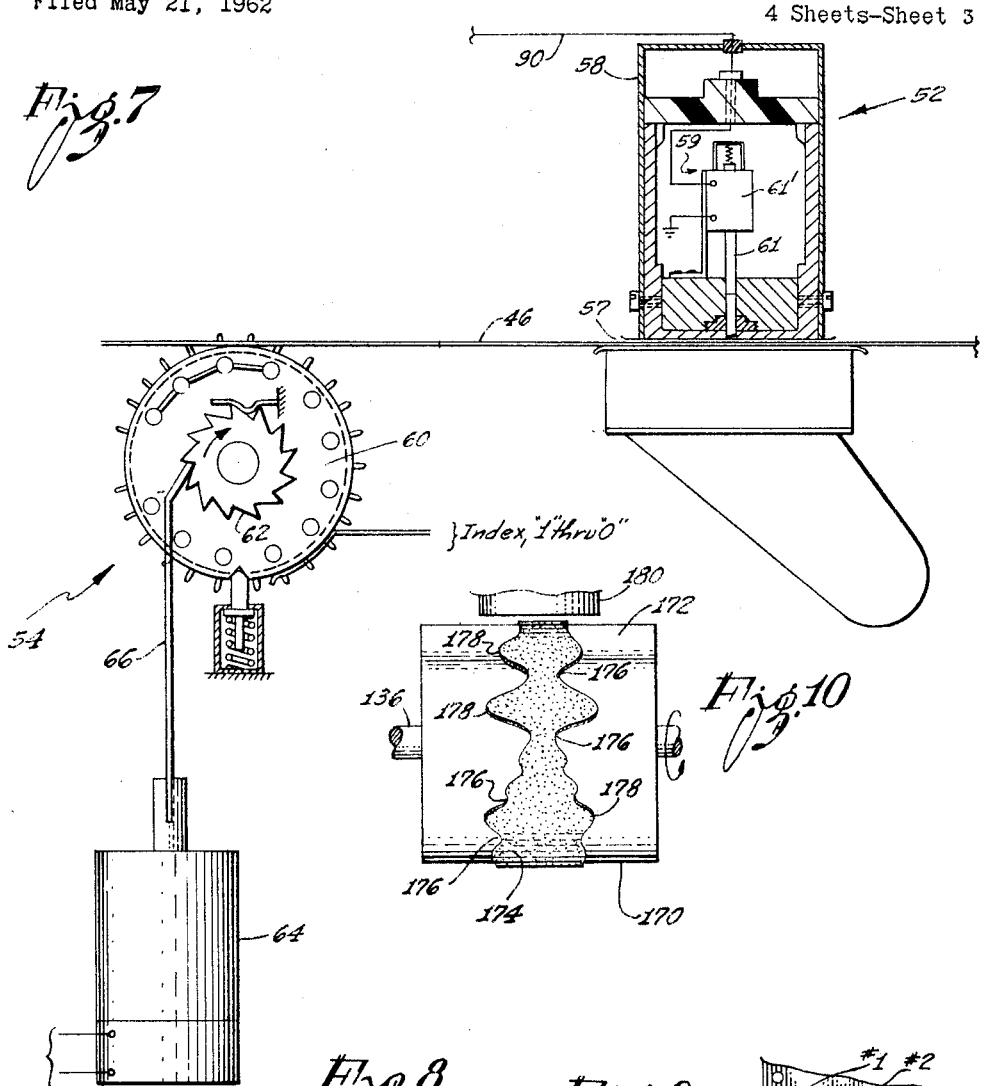
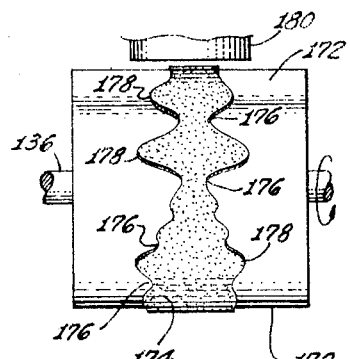
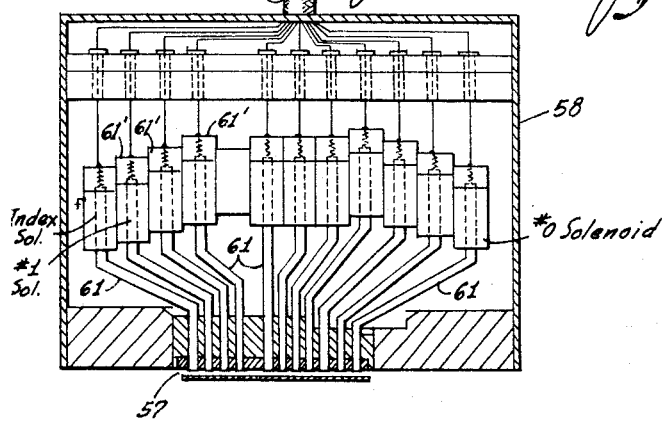
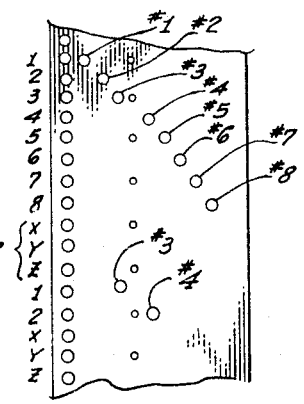
INVENTOR:
Harold F. Rieth
Attorneys Aug. 2, 1966 H. F. RIETH 3,264,452
DATA PROCESSING APPARATUS
Filed May 21, 1962 4 Sheets-Sheet 4

INVENTOR.
Harold F. Rieth
Attorneys.

United States Patent Office 3,264,452
Patented August 2, 1966

3,264,452
DATA PROCESSING APPARATUS
Harold F. Rieth, Pasadena, Calif., assignor to Packard-Bell Electronics Corporation, Los Angeles, Calif., a corporation of California
Filed May 21, 1962, Ser. No. 196,147
5 Claims. (Cl. 235—61.6)

The present invention relates to manually actuated keyboard machines and, more particularly, to such machines that will orally read back data manually fed into the machine to thereby facilitate confirming the accuracy of the manual operation as well as preserving a record for future use.

At the present time there are a large number of devices such as calculating machines, adding machines, computers, etc., having keyboards wherein an operator feeds information into the device by manually manipulating various keys corresponding to the data contained in a written list. Since the accuracy with which the machine may operate is limited by the accuracy with which the data is originally fed through the keyboard, it is usually desirable to check or verify the data which has been fed into the machine. One means for accomplishing this objective is to cause the machine to simultaneously print the data as it is fed into the machine and to then manually cross check between the data printed by the machine and the original copy from which the data was obtained. Although a single operator may perform the cross checking operation and detect a large majority of any errors present, it is extremely difficult for the operator to continually refer back and forth between the two written groups of data without occasionally becoming confused or reading the wrong data. Thus, even the cross checking operation permits a certain margin of error.

In order to further reduce the probability of an error and to facilitate the cross checking operation, the operator may obtain the assistance of a second person. One of the persons may then read aloud one of the groups of printed data while the second party compares the orally read data with the group of printed data. Such a double operation reduces the chance of error to a minimum. However, it requires the time of two persons and is, therefore, very expensive from a labor standpoint. It also frequently results in an extended time delay until two persons are simultaneously available for the cross checking operation. Accordingly, heretofore it has been very difficult, expensive and time consuming to confirm the accuracy of data that has been manually fed into a keyboard.

It is now proposed to overcome the foregoing difficulties by providing means whereby the data manually fed into a machine may be cross checked against the source of the data. More particularly, it is proposed to provide means whereby a single operator may rapidly cross check the data which has been fed into the machine with a minimum margin of error. This is to be accomplished by providing in a keyboard machine means that are actuated simultaneously with the keyboard and will subsequently audibly "read back" the data which was previously fed into the machine by the operator.

According to one form of the invention means are provided that are operatively interconnected with the keyboard of the machine so as to be actuated thereby. Each time the operator depresses a key in the keyboard an appropriate recording is made for subsequent playback. This recording may be an English word or a code equivalent thereto corresponding to the data fed into the keyboard. At any suitable time following the feeding of the data through the keyboard the operator can cause the recording to be played back through a suitable reproduction system that will orally recite the data previously fed into the machine. At the same time, the operator may listen to the recitation of the data while continuously directing all of his visual attention to the original written list from which the data was obtained. Thus, after the operator has completed feeding the data into the machine, the machine may be made to orally recite back data fed into the machine while the operator listens to the oral recitation of the data and compares it against the original list.

These and other features and advantages of the present invention will become readily apparent from reading the following detailed description thereof, particularly when taken in connection with the accompanying drawings wherein like reference numerals refer to like parts and wherein:

FIGURE 1 is a perspecttve view of a keyboard machine embodying one form of the present invention;

FIGURE 2 is a cross-sectional view of a portion of the keyboard of the machine of FIGURE 1;

FIGURE 3 is a cross-sectional view taken substantially along the plane of line 3—3 in FIGURE 2 of a detent mechanism for setting keys in the keyboard;

FIGURE 4 is a fragmentary perspective view of the detent mechanism of FIGURE 3;

FIGURE 5 is a cross-sectional view of another portion of the keyboard;

FIGURE 6 is an exploded perspective view in diagrammatic form of the recording and reproducing portions of the present machine;

FIGURE 7 is a diagrammatic cross-sectional view of the recording portion of the system of FIGURE 6 having punch means for perforating a paper tape;

FIGURE 8 is a transverse cross-sectional view of the punch means of FIGURE 7;

FIGURE 9 is a fragmentary view of a portion of a tape perforated by the punch means of FIGURE 8;

FIGURE 10 is a side view of a modification of a portion of the reproduction portion of FIGURE 6;

Figure 11:
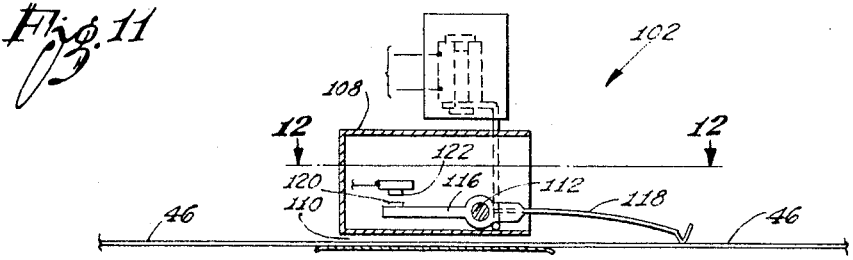
FIGURE 11 is a transverse cross-sectional view of a readout section of the reproduction portion of the present system.
Figure 12:
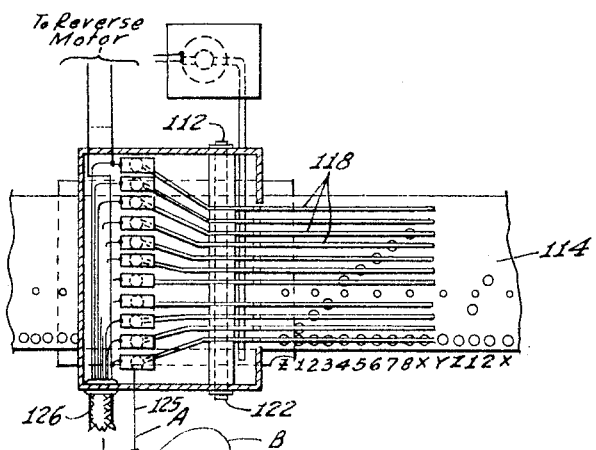
FIGURE 12 is a plan view taken substantially along the plane of line 12—12 in FIGURE 11.

Referring to the drawings in more detail, the present invention is particularly adapted to be embodied in a machine 10 having a manually actuatable keyboard 12. This machine 10 may be of any desired variety and the keys may represent any desired characters such as numbers and/or letters. In addition, the machine may be of the mechanical or electronic variety and may be effective to perform any desired function. However, in the present instance, for purposes of illustration, it is shown as a calculating machine for adding or subtracting a plurality of numbers.

The present keyboard 12 includes eight columns 14 of keys with each column 14 having ten keys 16 representing the Arabic numerals one through zero, inclusive. In addition, suitable control buttons such as a reverse button 15, a start button 17, a stop button 19 and a function button 21 may be provided for controlling the operation of the machine 10.

A first set 42 of windows may be provided for visually displaying a number corresponding to the keys 16 that are in a depressed position. In addition, a second set 44 of windows may be provided for presenting a running total of the numbers which have been accumulated in the machine 10 as a result of performing the various functions on the numbers that have been read into the keyboard 12.

Each of the keys 16 comprises an enlarged head 18 that is mounted on the upper end of a shank 20. Springs 22 are provided to resiliently bias the head 18 upwardly so that the portion thereof having the number thereon projects through an opening 24 in an inclined panel 26. The lower ends of the shanks 20 extend inwardly through the panel 26 and are connected to links 27. Each of these links 27 may have the center thereof mounted on a fulcrum 29 while the opposite end may be connected to a suitable internal mechanism in the calculating machine 10 for performing the desired operation. Thus, by depressing one of the keys 16, the linkage will set the internal mechanism of the machine to correspond thereto.

A suitable detent means 28 may be provided for retaining the key 16 depressed and the internal mechanism properly set. In the present instance this detent means 28 includes a separate bar 30 for each column 14 of keys 16. Each bar 30 extends along the sides of the shanks 20 and is biased by a resilient spring 34. A solenoid 38 may be provided for moving the bar 30 in opposition to the spring 34. A separate spring biased detent is provided for each of the keys 16. Each detent 28 includes a resilient bar 32 that engages and rides against the side of a shank 20 and so as to fit into a recess 36 in the side of the shank 20. When a key 16 is depressed, the recess 36 in the side of the shank 20 will be aligned with the bar 32 and the key 16 will be retained depressed.

The lower end of each shank 20 includes an enlarged head 70 that is positioned to engage a switch 72. The switch includes a movable contact 74 that is effective to move into engagement with a fixed contact 76. The fixed contacts 76 are in turn interconnected with the conductors in a cable 78. It may thus be seen that if the keys 16 are depressed, in addition to setting the mechanical linkage, a switch 72 will be actuated in each of the columns containing a depressed key and a corresponding conductor 77 in each of the corresponding cables 78 will also be energized.

It may thus be seen that in order to feed data such as a number into the machine 10, the operator may read the number from a written list and then manually depress the various keys 16 in the various columns 14 so as to correspond to the various digits in the number. This will, in turn, rotate the links 27 so as to set the internal mechanism of the machine 10 to correspond to the number. The detents 28 will then hold the keys 16 depressed whereby the internal mechanism will be set so that the required operation or function may be performed thereon. In order to cause the desired function such as adding the number to be performed, the function button 21 may be depressed. This will cause the internal mechanism to add the number in the first set 42 of windows to the total in the second set 44 of windows and display a new total in the second set of windows 44. In order to clear the keys, the solenoids 38 for each column 14 are energized at the conclusion of the function operation so as to pull the bars 30 axially and extract the bars 32 from the recesses 36 in the shanks 20. This will free all of the shanks 20 and permit the springs 22 to raise the keys 16 to their normal positions.

Depressing the function button 21 may also cause a record to be made of the numbers such that an audio reproduction of the numbers may be made. There is a large variety of means by which this may be accomplished. For example, a series of words corresponding to the digits in the number may be recorded on a magnetic tape or any other suitable recording media whereby the recording may be played back so as to orally recite the digits. However, in the present instance, recording means 50 are provided that are particularly adapted to record the digits in coded form by punchings or perforations in a paper tape 46.

The recording means 50 includes punch means 52 for perforating the paper tape 46 as it passes therethrough, a tape transport 54 for moving the tape 46 through the punch means 52, and a switch 56 for actuating the punch means 52 in response to the setting of the keys 16 in the keyboard 12 of the machine 10.

The punch means 52 which may be of any well-known variety includes a housing 58 having a passage 57 that extends transversely therethrough adjacent the bottom. The tape 46 may be positioned in the passage to slide longitudinally therethrough without any lateral movement. A plurality of individual punches 59 are disposed in the housing 58 and aligned to form a row that extends transversely of the direction of movement of the tape 46. Each of these individual punches corresponds to one of the keys 16 in each of the columns 14. More particularly, the position of the punch will correspond to the magnitude of the number it represents, i.e., the number 1 punch may be on the left end of the row and the number 0 punch may be on right.

Each of the punches 59 may include a shank 61 that has a cutting end on one disposed above the paper tape 46 and a solenoid on the other end. Energizing the solenoid 61' will cause the shank 61 to move axially and force the cutting end through the tape 46. This will make an opening through the tape 46 that will have a lateral position corresponding to the punch 59 which was energized. It will thus be seen that the apertures in the tape 46 will be position coded by their lateral location to correspond to one of the digits 1 through 0.

The tape transport 54 includes a wheel 60 having a cylindrical exterior that is positioned to roll along the surface of the tape 46 so as to carry it therewith. If desired, a plurality of teeth may extend radially outwardly from the periphery of the wheel 60 and extend through a line of perforations in the tape 46. This will insure a positive driving action that will accurately position the tape 46 for each punching operation. The present wheel 60 includes a cogwheel portion 62 having a plurality of notches or teeth therein. A solenoid 64 is provided that has a ratchet 66 for engaging the teeth. By energizing the solenoid 64 the ratchet 66 will be retracted and the wheel 60 rotated to thereby advance the tape 46 through the punch means 52 by one position so that a new perforation may be made therein.

The switch 56 is effective to connect the various switches 72 in the keyboard 12 with the punches 59 whereby the punch that is actuated will correspond to the particular key that is depressed.

Although the switch 56 may be of any suitable variety, in the present instance it is of the rotary type having a generally cylindrical configuration. The switch 56 includes a plurality of fixed contacts that are arranged in rows that extend axially of the configuration and are electrically interconnected with rows of connectors 66 on the exterior of the configuration. There is a separate row 68 of these fixed contacts for each column 14 of keys in the keyboard 12 plus extra rows corresponding to the number of extra spaces to be left on the tape 46 between the succeeding numbers punched therein. In the present instance there are eight columns 14 of keys in the keyboard 12 and it is desired to leave three spaces X, Y and Z in the tape between numbers. Accordingly, there are eight rows 68 plus three extra rows 82 to make a total of eleven rows of fixed contacts in the present switch 56.

Each of the rows 68 of fixed contacts extends axially of the configuration and has eleven contacts. This corresponds to the numbers 1 through 0 present in the columns 14 of keys 16, plus one additional contact having a connector 71. The fixed contacts corresponding to 1 through 0 in the first eight rows 68 are connected to the switches 72 in the keyboard 12 by means of the cables 78. Thus, whenever one of the keys 16 in a column 14 is depressed, it will be effective to close a corresponding switch 72 and interconnect it with one of the contacts in the corresponding row of fixed contacts in the switch 56.

The eleventh fixed contacts 80 in the ninth, tenth and eleventh rows 82 are all connected together by means of a common conductor 84. Thus, when the rotary contact is in these positions, contact will be made through the eleventh movable contact.

Rotary contacts are mounted on a shaft 86 that is disposed inside of the cylindrical configuration so as to extend axially thereof. There are eleven separate movable contacts so that the moving contacts may simultaneously engage all of the fixed contacts in any given row. The shaft 86 is interconnected with a rotary solenoid drive 88 that will rotate the shaft so as to sequentially step the rotary contacts into operative engagement with the succeeding rows of fixed contacts while momentarily stopping at each of the rows. Once the drive solenoid 88 is energized, it will continue to rotate the shaft 86 until it has made one complete revolution and returned to its original position.

The various movable contacts are all connected to the conductors in a cable 90. This cable 90 extends to the punch means 52 and more particularly the first ten conductors are connected to the solenoids 61' for the individual punches 59. An eleventh conductor in the cable is connected to the movable contact for engaging the connectors 80.

It may thus be seen that if the various keys 16 on the keyboard 12 are actuated by depressing them, the corresponding switches 72 will be actuated thereby establishing circuits to the corresponding fixed contacts in the switch 56. When all of the desired buttons 16 are depressed the function key 21 may be depressed. This will cause the machine 10 to perform the desired operation of adding the number in the first set of windows 42 to the number in the second set 44. In addition, the rotary solenoid 88 will be energized so as to cause the movable contact in the switch 56 to successively step around the entire switch. Initially, the eleventh movable contact will engage the three fixed contacts leading to the interconnected connectors 80 in the rows 82. This will cause three pulses to flow over the eleventh conductor in the cable 90 and through the conductor 92 whereby the solenoid 64 will be energized three times. This will cause the tape transport 54 to advance the tape 46 three spaces through the punch means 52 without any perforations being made therein. This will leave three blank spaces X, Y and Z in the tape to indicate the beginning of a new number.

The rotary contact in switch 56 will continue to step across the succeeding rows of fixed contacts. In the event the number fed into the keyboard 12 has fewer digits than there are columns 14 of keys 12, eight in the present instance, at least a portion of the columns on the left side of the keyboard 12 will not have any keys therein depressed. As a consequence, no connection will be made to the fixed contacts in the corresponding rows 68 in the switch 56. Thus, when the movable contact moves against such rows no punches will be energized and no perforations will be made in the tape 46. Also, the solenoid 64 for the tape transport mechanism 54 will not be energized and the tape 46 will not be advanced. When the movable contact does move into the row corresponding to the first column in which a key is depressed, i.e., the row representing the most significant digit of the number, one of the movable contacts will form a circuit to one of the solenoids in the punch means 52. This solenoid will thus be energized so that the shank 61 of a punch 59 will be extended and pierce the paper tape 46. The resultant aperture will have a transverse position corresponding to the magnitude of the most significant digit. As soon as the piercing operation is completed and the punch is withdrawn, a pulse will flow over the conductor 92 to the solenoid 62 in the tape transport mechanism 54. The solenoid will thus be energized whereby the wheel 60 will be rotated and the paper tape 46 advanced one position. The rotary solenoid 88 will also be energized so as to again move the movable contact into operative engagement with the row corresponding to the next most significant digit. The foregoing punching and advancing operations will be repeated and the tape 46 and switch 56 advanced until the switch has returned to its original position and the tape has a series of perforations corresponding to the most significant digits through the least signficant digit.

The reproduction portion 100 of the machine 10 is preferably adapted to reproduce as an audible recitation the various numbers fed into the machine 10. In the present instance the reproduction portion 100, which is shown in FIGURES 6, 11, 12 and 13, includes a pickoff unit 102, an audio readout unit 104, and loudspeaker 105 and/or earphone jack 106. The pickoff unit 102 includes a housing 108 having a passage 110 through which the punched paper tape 46 having the coded record thereon may travel. As may be seen in FIGURE 11, the pickoff unit 102 includes a shaft 112 that extends thereacross substantially normal to the direction of travel of the tape 46. A plurality of fingers 116 are pivotally mounted on the shaft 112 so as to have lateral positions corresponding to the digits 1 through 0, inclusive. The outer end of each finger 116 has a follower portion 118 that engages and rides along the surface of the tape 46. Each follower 118 travels along a line that includes the perforations that form the code for the digit corresponding to the value of the finger 116 carrying the follower 118.

Normally, the follower 118 will be disposed on the surface of the paper tape 46 so that the follower 114 will be maintained elevated. However, in the event a perforation passes under the follower 118, the follower 118 will momentarily be allowed to drop through the perforation and allow the finger 116 to pivot about the axis of the shaft 112.

The opposite end of each of the fingers 116 includes a set of electrical switch contacts 120 and 122. When the followers 118 on the ends of the fingers 116 are disposed on the paper tape 46, the contacts 120 and 122 will be retained in an open position so that a signal may not pass therethrough. However, in the event a perforation passes under a follower 118, the finger 116 to which it is secured will rotate about the shaft 112 and this will cause the contacts 120 and 122 to be closed. As soon as the perforation has passed the follower 118, the finger 116 will be rotated so as to reopen the contacts 120 and 122.

All of the contacts such as the movable contacts 120 are interconnected with a single common electrical conductor 125 that leads to one input for the audio readout unit 104. Each of the other contacts 122 are connected to separate conductors in the cable 126. The opposite end of the cable 126 leads to an input to the audio readout unit 104.

The audio readout unit 104 includes an audio amplifier 130 and a reproducer 132. The audio amplifier 130 may be of conventional design and has the output thereof connected to the loudspeaker 105 and/or a jack 106 for an earphone 107. The reproducer 132 may be of any suitable variety for repeatedly producing a signal corresponding to several different sounds. For example, the reproducer 132 may be of the so-called photoelectric variety. However, in the present instance it comprises a drum 134 that is mounted on a shaft 136 so as to rotate about the axis thereof. The shaft 136 may be operatively connected to the take-up reel by a suitable gear reduction means 138. The drum 134 includes a plurality of endless sound tracks 140 that run circumferentially therearound at axially spaced intervals. In order to sense the passage of the sound tracks 140, a plurality of magnetic heads 142 may be disposed adjacent the surface of the drum 140 so as to scan only a single track for receiving a signal therefrom. The output from each of the heads 142 is connected to one of the conductors in the cable 126 leading to the pickup unit 102.

The various sound tracks 140 are endless recordings of one of the words, preferably in English, for the digits 1 through 0, inclusive. Thus, by selectively moving the various fingers 116 to close the contacts 120 and 122, it is possible to selectively cause any desired digit 1 through 0, inclusive, to be audibly spoken from the loudspeaker 105 or earphone 107.

It may thus be seen that once the operator has completed feeding a set of the numbers into the machine 10 or has reached a point where it is desired to cross check the numbers fed into the machine 10, the operator may cause the supply reel 152 and the take-up reel 154 to run in reverse so as to rewind the punched tape onto the supply reel 152. After the tape 46 has been rewound onto the supply reel 152 the motor will again run in a forward direction. This will simultaneously run the take-up reel 154 in a forward direction and drive the shaft 136 so as to rotate the drum 134. This will cause the tape 114 to travel through the passage 110 in the pickoff unit 102 whereby the followers 118 on the ends of the fingers 116 will travel along their respective tracks so as to scan the various perforations in the tape 114. Each of these perforations, of course, represents the value of a digit that has been fed into the machine. As the various perforations pass the followers 118, the followers will drop into the perforations so as to intermittently close the various sets of contacts 120 and 122. Each time one of these contacts closes it will be effective to interconnect the output from a selected magnetic head 142 to the input to the audio amplifier 130. This, in turn, causes the speaker 105 or earphone 107 to audibly speak the English word for the particular digit corresponding to the perforation.

Figure 13:
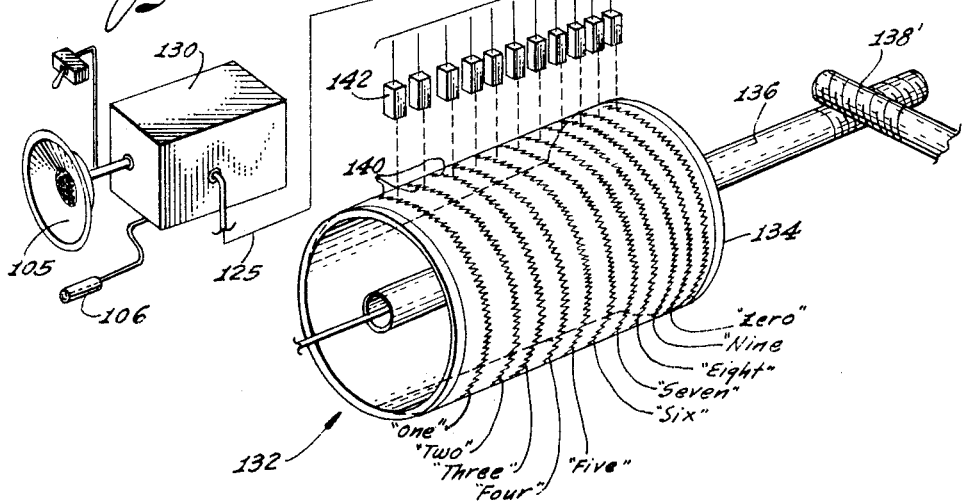
FIGURE 13 is an exploded perspective view of a portion of the readout mechanism in the present invention.

As an alternative to the foregoing embodiment, the portion of the reproduction system having the drum 134 and the magnetic heads 142, as shown in FIGURE 13, may be modified to employ a recorded signal means 169 such as shown in FIGURE 10. This signal means 169 includes a cylindrical drum 170 that may be mounted on the shaft 136 so as to rotate therewith substantially the same as the drum 134. The exterior of the drum 170 includes a cylindrical surface 172 having a reduced diameter. One or more irregularities such as a ridge 174 may be provided that extends circumferentially around the drum 170. In the present instance the ridge is of substantially uniform thickness or height. A magnetic head 180 may be positioned so as to be very close to the surface of the ridge 174. Thus, a very narrow air gap 182 will be disposed between the ridge 174 and the head 180. The head 180 corresponds to one of the heads 142 and is electrically connected to the audio amplifier 130. The width of this ridge 174 will vary in the axial direction of the drum 170 so as to provide narrow portions 176 and wide portions 178. It will thus be seen that as the ridge travels beneath the head 180 the size of the air gap 182 will vary in accordance with the variations of the narrow portions 176 and the wide portions 178.

It will thus be seen that if the ridge 174 consists of a magnetic material such as iron and the contour of the ridge 174 varies so as to correspond to a word such as one of the words "zero" or "nine" or any of the words therebetween, these ridges 174 may act as the equivalent of the sound tracks 140 on the drum 134. It may be seen that since the size of the air gap will vary over a very wide range, a very strong signal may be obtained from a very simple and inexpensive head 180.

It may thus be seen that a machine has been provided which is not only adapted to perform certain functions on data which is supplied thereto by means of a keyboard but also includes a talk out system that will audibly reproduce words corresponding to the data upon which the functions have been performed. It will be readily apparent to those skilled in the art that numerous changes and modifications may be made to the foregoing disclosure without departing from the spirit of the invention. Accordingly, the foregoing disclosure is for illustrative purposes only and is in no way restrictive of the invention which is defined only by the claims which follow.

What is claimed is:

1. In combination for use with a tape,
a calculating machine including a keyboard with a plurality of manually actuatable keys representing preselected data and including function means for causing said machine to perform particular arithmetic functions on the data represented by the keys actuated in said keyboard,
recording means disposed relative to the tape to make recordings on the tape corresponding to the keys actuated in said keyboard,
tape transport means for advancing said tape through said recording means,
switch means operatively interconnected with said function means and said recording means, said switch means being effective for actuating said recording means for positioning a sequence of recordings on said tape corresponding to said group of actuated keys,
means disposed relative to said tape for sensing the recordings on the tape during the advance of the tape by the tape transport means, and
means operatively coupled to the sensing means for producing audio sounds each corresponding to a different one of the numbers recorded on the tape.

2. In combination for use with a recording medium,
a calculating machine including a keyboard with a plurality of manually actuatable keys representing preselected numerical data and including function means for causing said machine to perform particular arithmetic functions on the data represented by the actuation of the actuatable keys in said keyboard,
recording means effective to make a sequence of recordings on the recording medium,
switch means operatively interconnected with said function means and said recording means for actuating said recording means in response to the actuated keys in said keyboard for producing said sequence of recordings representing the numerical data, and
means responsive to said sequence of recordings on said medium for reproducing an audible reproduction of the numerical data represented by the keys actuated in said keyboard.

3. In combination for use with a tape,
a calculating machine including a keyboard with a plurality of manually actuatable keys representing preselected numerical data and including function means for causing said machine to perform particular arithmetic functions on the data represented by the particular keys actuated in said keyboard,
punch means for perforating the tape as it advances therethrough,
a tape transport responsive to actuation of said function means for causing said tape to advance therethrough,
switch means interconnecting said punch means with the actuated keys in said keyboard for causing said punch means to perforate said tape in a preselected sequence corresponding to the numerical information represented by the actuated keys,
means operatively coupled to the tape for sensing the perforations in the tape, and
means operatively coupled to the sensing means for producing spoken words for each perforation on the tape to provide an audio indication of the numerical indications represented by the perforations.

4. In combination for use with a tape,
a calculating machine including a keyboard with a plurality of manually actuatable keys representing preselected numerical data and including function means for causing said machine to perform particular arithmetic functions on the data represented by the particular keys actuated in said keyboard, marking means for marking the tape as it advances therethrough, a tape transport responsive to actuation of said function means for causing said tape to advance therethrough, switch means interconnecting said marking means with the actuated keys for causing said marking means to mark said tape in a preselected sequence corresponding to the actuated keys, and means positioned to scan said tape and sense said markings and, in accordance with the sensing of the markings, to produce audible signals which correspond to the data represented by said actuated keys.

5. In combination for use with a tape, a calculating machine including a keyboard with a plurality of manually actuatable keys representing preselected numerical data and including function means for causing said machine to perform particular arithmetic functions on the data represented by the particular keys actuated in said keyboard, recording means for recording on the tape as it advances therethrough, a tape transport responsive to actuation of said function means for causing said tape to advance therethrough, switch means interconnecting said punch means with the actuated keys for causing said recording means to produce recordings on said tape in a preselected sequence corresponding to the actuated keys, reproduction means having a separate sound track for each of the numerical data represented by said keys and effective to produce an audible signal of the numerical data, and means disposed relative to the tape and operatively coupled to the reproduction means for scanning said tape to sense said recordings and to activate the different sound tracks in accordance with the recordings sensed on the tape.

References Cited by the Examiner
UNITED STATES PATENTS

| | | | |
|---|---|---|---|
| 1,859,930 | 5/1932 | Miller | 179—100.2 |
| 2,546,850 | 3/1951 | Chancenotte | 179—100.2 |
| 2,771,509 | 11/1956 | Dudley et al. | 179—1 |

DARYL W. COOK, *Acting Primary Examiner.*

MALCOLM A. MORRISON, *Examiner.*

R. COUNCIL, *Assistant Examiner.*